(12) United States Patent
Sakakibara

(10) Patent No.: US 9,188,101 B2
(45) Date of Patent: Nov. 17, 2015

(54) POWER CIRCUIT

(71) Applicant: KABUSHIKI KAISHA TOYOTA JIDOSHOKKI, Kariya-shi (JP)

(72) Inventor: Norihisa Sakakibara, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 0 days.

(21) Appl. No.: 13/845,234

(22) Filed: Mar. 18, 2013

(65) Prior Publication Data

US 2013/0257062 A1    Oct. 3, 2013

(30) Foreign Application Priority Data

Mar. 30, 2012   (JP) ................................. 2012-080848

(51) Int. Cl.

| | |
|---|---|
| F02N 11/00 | (2006.01) |
| H02P 9/04 | (2006.01) |
| F02N 11/04 | (2006.01) |
| F02N 11/08 | (2006.01) |
| F02N 99/00 | (2010.01) |
| B60R 16/03 | (2006.01) |
| F02N 11/10 | (2006.01) |
| F02D 41/20 | (2006.01) |

(52) U.S. Cl.
CPC .............. *F02N 11/087* (2013.01); *B60R 16/03* (2013.01); *F02N 11/0814* (2013.01); *F02D 2041/201* (2013.01); *F02D 2041/2058* (2013.01); *F02N 11/10* (2013.01); *F02N 2011/0874* (2013.01); *F02N 2250/02* (2013.01); *Y02T 10/48* (2013.01)

(58) Field of Classification Search
USPC ........... 290/38 R, 38 A, 38 C; 74/6; 123/179; 355/126, 131; 322/24, 28, 44, 20
See application file for complete search history.

(56) References Cited

U.S. PATENT DOCUMENTS

| | | | | |
|---|---|---|---|---|
| 5,198,698 | A | * | 3/1993 | Paul et al. ........................ 307/64 |
| 5,198,970 | A | * | 3/1993 | Kawabata et al. ............... 363/37 |
| 5,216,402 | A | * | 6/1993 | Carosa ............................ 336/66 |

(Continued)

FOREIGN PATENT DOCUMENTS

| | | |
|---|---|---|
| EP | 1882849 | 1/2008 |
| EP | 2354532 | 8/2011 |

(Continued)

OTHER PUBLICATIONS

European Patent Application No. 13157597.9: European Search Report dated Jul. 17, 2013, 7 pages.

*Primary Examiner* — Tulsidas C Patel
*Assistant Examiner* — Charles Reid, Jr.
(74) *Attorney, Agent, or Firm* — Baker & Hostetler LLP

(57) ABSTRACT

A power circuit includes a boost circuit having a boost switching element, a coil provided between a battery and the boost switching element and a rectifier element provided between the coil and a load, a first switch connected to the boost circuit in parallel, a current detection circuit detecting current flowing through the first switch and a control circuit turning on the first switch during a normal state other than a restart of an engine after an idling stop and turning off the first switch and controlling an operation of the boost switching element at a restart of the engine after an idling stop so that voltage of the battery is boosted and supplied to the load. The control circuit determines based on the current detected by the current detection circuit during the normal state whether or not the first switch has an open fault.

9 Claims, 8 Drawing Sheets

(56) References Cited

U.S. PATENT DOCUMENTS

| | | | |
|---|---|---|---|
| 5,302,858 A * | 4/1994 | Folts | 307/66 |
| 5,615,100 A * | 3/1997 | Radecker et al. | 363/97 |
| 5,633,577 A * | 5/1997 | Matsumae et al. | 322/37 |
| 6,304,054 B1 * | 10/2001 | Granberg et al. | 320/104 |
| 6,548,985 B1 * | 4/2003 | Hayes et al. | 320/108 |
| 6,977,513 B2 * | 12/2005 | Matsunaga | 324/713 |
| 8,009,443 B2 * | 8/2011 | Krause | 363/17 |
| 8,030,882 B2 * | 10/2011 | Ito et al. | 320/104 |
| 8,138,440 B2 * | 3/2012 | Onufriyenko et al. | 218/154 |
| 8,183,819 B2 * | 5/2012 | Sugano | 320/103 |
| 8,378,646 B2 * | 2/2013 | Shimada et al. | 323/222 |
| 2004/0075423 A1 * | 4/2004 | Itabashi et al. | 323/282 |
| 2005/0047181 A1 * | 3/2005 | Yamamoto et al. | 363/60 |
| 2005/0285572 A1 * | 12/2005 | Geren et al. | 320/134 |
| 2005/0285581 A1 * | 12/2005 | Hayakawa | 323/282 |
| 2008/0084714 A1 * | 4/2008 | Kawasaki et al. | 363/21.01 |
| 2008/0129259 A1 * | 6/2008 | Endo et al. | 323/271 |
| 2009/0322101 A1 | 12/2009 | Reynolds | |
| 2011/0187184 A1 * | 8/2011 | Ichikawa | 307/10.1 |
| 2012/0068663 A1 * | 3/2012 | Tanikawa et al. | 320/109 |
| 2012/0075761 A1 * | 3/2012 | Miura et al. | 361/93.1 |
| 2012/0106013 A1 * | 5/2012 | Yang et al. | 361/87 |
| 2012/0293902 A1 * | 11/2012 | Huang et al. | 361/93.7 |

FOREIGN PATENT DOCUMENTS

| | | |
|---|---|---|
| JP | 2005-112250 | 4/2005 |
| WO | WO 2012/008124 | 1/2012 |

* cited by examiner

POWER CIRCUIT

CROSS REFERENCE TO RELATED APPLICATIONS

This application claims priority to Japanese Application No. 2012-080848 filed Mar. 30, 2012.

BACKGROUND

The present invention relates to a power circuit that allows a battery to supply voltage stably to a load in a vehicle with an idling stop control.

Recently a vehicle with an idling stop control has been put to practical use for reducing fuel consumption and exhaust gas emission. The idling stop control of the vehicle turns off its engine automatically when it is detected that the vehicle stops e.g. at a traffic light and restarts the engine automatically when it is detected that the vehicle is about to start again.

When the engine of such vehicle is restarted after an idling stop, a large current flows to a starter motor of the vehicle, so that the voltage of a battery of the vehicle is dropped temporarily. Accordingly, the voltage of power to various loads such as electronic devices other than the starter motor which are connected to the battery is also dropped temporarily at a restart of the vehicle. Therefore, there is a fear that the voltage falls below a level that is required for any electronic device to operate properly, thus inviting a temporary malfunction of the device. For example, a car navigation system and an audio system may be reset or a sound may jump in the audio system. Thus, unforeseeable operation of any electronic device may occur.

To solve the above problem, a power circuit may be provided between the battery and the load so as to keep constant the voltage required for the loads even when a voltage drop of the battery occurs temporarily.

Japanese Patent Application Publication 2005-112250 discloses a power circuit to solve the above problem. The power circuit includes a boost circuit and a bypass relay that bypasses the boost circuit when the relay is closed. At a restart of an engine after an idling stop, the boost circuit is activated with the bypass relay kept opened, so that the voltage of a battery is boosted by the boost circuit and the boosted voltage is supplied to various electronic loads of the vehicle. During a normal state other than the restart of the engine, the bypass relay is kept closed thereby to bypass the boost circuit, so that the voltage of the battery is supplied to the loads through the bypass relay.

When the voltage of the battery is dropped temporarily at the restart of the engine after an idling stop, the power circuit ensures that the voltage required for the loads is supplied. Meanwhile, during the normal state other than the restart of the engine, the voltage of the battery is supplied to the loads without being dropped by a switching element in the boost circuit, so that supply of the voltage required for the loads can be maintained.

However, if an open fault occurs in the bypass relay in the power circuit and the voltage of the battery is supplied at all times to the loads through the boost circuit, the voltage of the battery to be supplied to the loads is dropped by the switching element in the boost circuit.

The present invention is directed to providing a power circuit that allows supply of a stable voltage to loads of electronic devices of a vehicle equipped with an idling stop control.

SUMMARY

A power circuit includes a boost circuit having a boost switching element, a coil provided between a battery and the boost switching element and a rectifier element provided between the coil and a load, a first switch connected to the boost circuit in parallel, a current detection circuit detecting current flowing through the first switch and a control circuit turning on the first switch during a normal state other than a restart of an engine after an idling stop and turning off the first switch and controlling an operation of the boost switching element at a restart of the engine after an idling stop so that voltage of the battery is boosted and supplied to the load. The control circuit determines based on the current detected by the current detection circuit during the normal state whether or not the first switch has an open fault.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF ILLUSTRATIVE EMBODIMENTS

Figure 1:
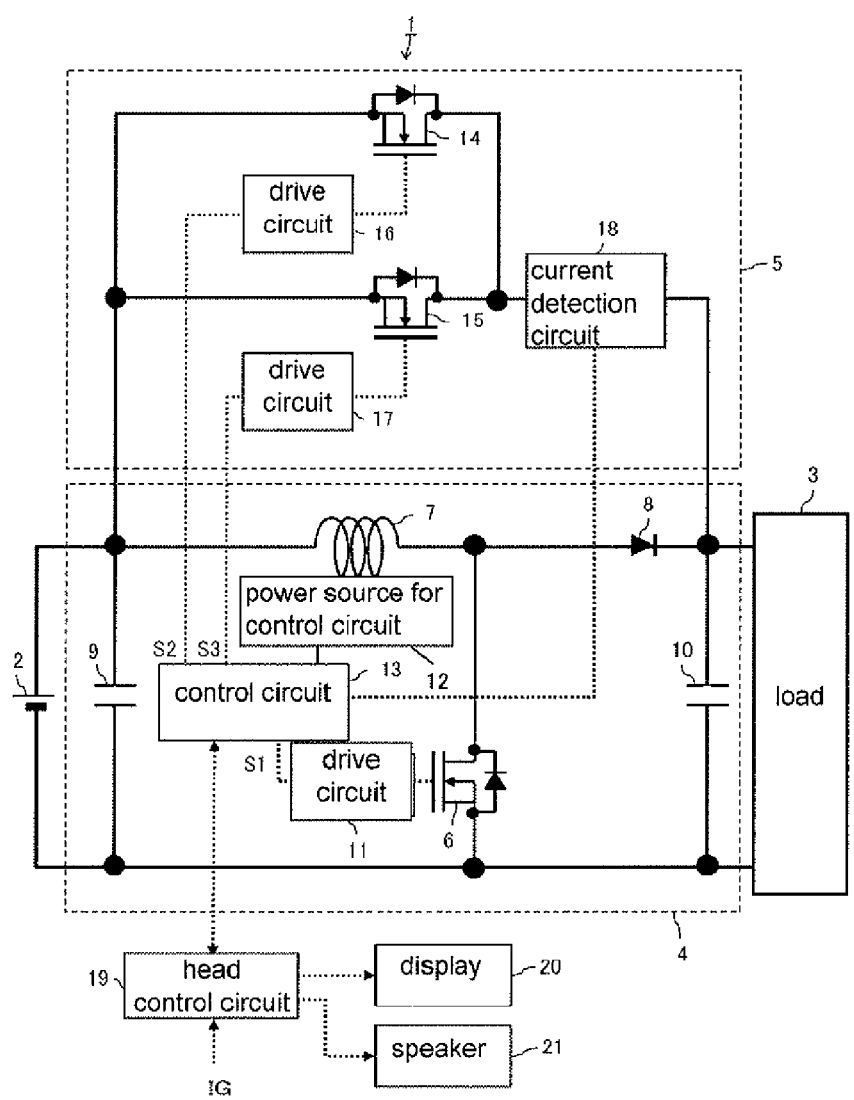
FIG. 1 is a schematic configuration diagram showing a power circuit according to a first embodiment of the present invention.

Referring to FIG. 1, the power circuit according to the first embodiment of the present invention is generally designated by numeral 1. The power circuit 1 is adapted to keep constant the voltage of a battery 2 which is mounted on a no-idling vehicle and also to supply the voltage to a load 3. The power circuit 1 includes a boost circuit 4 and a bypass circuit 5.

The boost circuit 4 boosts the voltage of the battery 2 and supplies the boosted voltage to the load 3 at a restart of an engine after an idling stop of the engine. The boost circuit 4 includes a boost switching element 6, a coil 7, a rectifier diode 8 (or a rectifier element), capacitors 9, 10, a drive circuit 11, a control circuit 13 and a power source 12 for the control circuit 13.

The boost switching element 6 is e.g. of Metal Oxide Semiconductor Field Effect Transistor (MOSFET) or Insulated Gate Bipolar Transistor (IGBT).

The coil 7 is provided between the battery 2 and the boost switching element 6. The rectifier diode 8 is provided between the coil 7 and the load 3. The capacitor 9 is provided in the input stage of the boost circuit 4.

The capacitor 10 is provided in the output stage of the boost circuit 4. The drive circuit 11 drives the boost switching element 6 based on a control signal S1 transmitted by the control circuit 13.

The power source 12 supplies power to the control circuit 13. The bypass circuit 5 includes a first switch 14, a second switch 15, drive circuits 16, 17 and a current detection circuit 18.

The first and the second switches 14, 15 are e.g. of a MOSFET or a relay and connected to the boost circuit 4 in parallel. The drive circuit 16 drives the first switch 14 based on a control signal S2 transmitted by the control circuit 13 and the drive circuit 17 drives the second switch 15 based on a control signal S3 transmitted by the control circuit 13.

The current detection circuit 18 is made e.g. of a shunt resistance, a current transformer or a Hall element and serves as a current detection sensor. The current detection circuit 18 is provided between the connecting point of the first and the second switches 14, 15 and the load 3.

The control circuit 13 transmits control signals S1 through S3 based on various data sent by a head control circuit 19. The control circuit 13 consists of software or hardware. The control circuit 13 consisting of software includes a CPU and a memory. A program stored in the memory is read and executed by the CPU. The control circuit 13 may be provided outside the boost circuit 4.

During the normal state other than the restart of the engine subsequent to an idling stop, the control circuit 13 transmits control signals S2, S3 for keeping the first and the second switches 14, 15 on or closed based on various data sent from the head control circuit 19 and also a control signal S1 for keeping the boost switching element 6 off or opened. During such normal state, the battery 2 is electrically connected to the load 3 through the then closed first and second switches 14, 15, so that electric current flows from the battery 2 to the load 3 through the switches 14, 15, bypassing the boost circuit 4. Therefore, no boosting of the voltage of the battery 2 is performed by the boost circuit 4. Supplying of the required voltage to the load 3 during the normal state other than restarting of the engine subsequent to an idling stop can be maintained by making the voltage drop of the battery 2 due to the first and the second switches 14, 15 of the bypass circuit 5 smaller than that due to the coil 7 and the rectifier diode 8 of the boost circuit 4. This mode of operation of the control circuit 13 will be hereinafter referred to as "bypass mode".

At a restart of the engine after an idling stop, the control circuit 13 transmits the control signals S2, S3 as well as S1, wherein the signals S2, S3 are used for keeping the first and the second switches 14, 15 off or opened and the signal S1 for causing the boost switching element 6 to repeat on and off operation. Thus, the electrical connection between the battery 2 and the load 3 through the first and the second switches 14, 15 is cut off, but the boost circuit 4 is activated to boost the voltage of the battery 2, so that the boosted voltage of the battery 2 is supplied to the load 3. Therefore, even if the voltage of the battery 2 is dropped temporarily due to the operation of the starter motor for restarting of the engine, supplying of the voltage required for the load 3 can be maintained. This mode of operation of the control circuit 13 will be hereinafter referred to as "boost mode".

In the bypass mode operation, the control circuit 13 determines whether or not the current detected by the current detection circuit 18 at a predetermined time interval (e.g. 5 seconds) is at a threshold value lth (e.g. 5 A (amperes)) or higher. If the control circuit 13 determines that the detected current is less than lth, in other words, when the load 3 is not driven and no current (e.g. 5 A) is flowed to the load 3, the bypass mode is continued. On the other hand, if the control circuit 13 determines that the detected current is at lth or more, in other words, when the load 3 is being driven and a current is flowed to the load 3, it will be determined whether or not either or both of the first and the second switches 14, 15 suffers from open fault.

In the bypass mode of operation, the control circuit 13 determines whether or not the first and the second switches 14, 15 have an open fault in the following manner. The control circuit 13 transmits the control signals S2, S3 to keep the first switch 14 on or closed and keep the second switch 15 off or opened for a predetermined length of time (e.g. 5 mS), respectively. If the current detected by the current detection circuit 18 is 0 A or substantially 0 A, the control circuit 13 determines that first switch 14 has an open fault and informs the head control circuit 19 (or output means) of the result. Subsequently, the head control circuit 19 gives the warning that the first switch 14 has an open fault on a display 20 (or output means) or by a speaker 21 (or output means).

The control circuit 13 also transmits the control signals S2, S3 to keep the first switch 14 off or opened and keep the second switch 15 on or closed for a predetermined length of time (e.g. 5 mS), respectively. If the current detected by the current detection circuit 18 is 0 A or substantially 0 A, the control circuit 13 determines that the second switch 15 has an open fault and informs the head control circuit 19 (or output means) of the result. The head control circuit 19 gives the warning that the second switch 15 has an open fault on the display 20 or by the speaker 21. Thus, during the normal state, the control circuit 13 turns off the first switch 14 and the second switch 15 alternately at a regular time interval (e.g. 5 S) and determines based on the current detected by the current detection circuit 18 whether or not the first switch 14 has an open fault while the second switch 15 is turned off and also whether or not the second switch 15 has an open fault while the first switch 14 is turned off.

Figure 2:
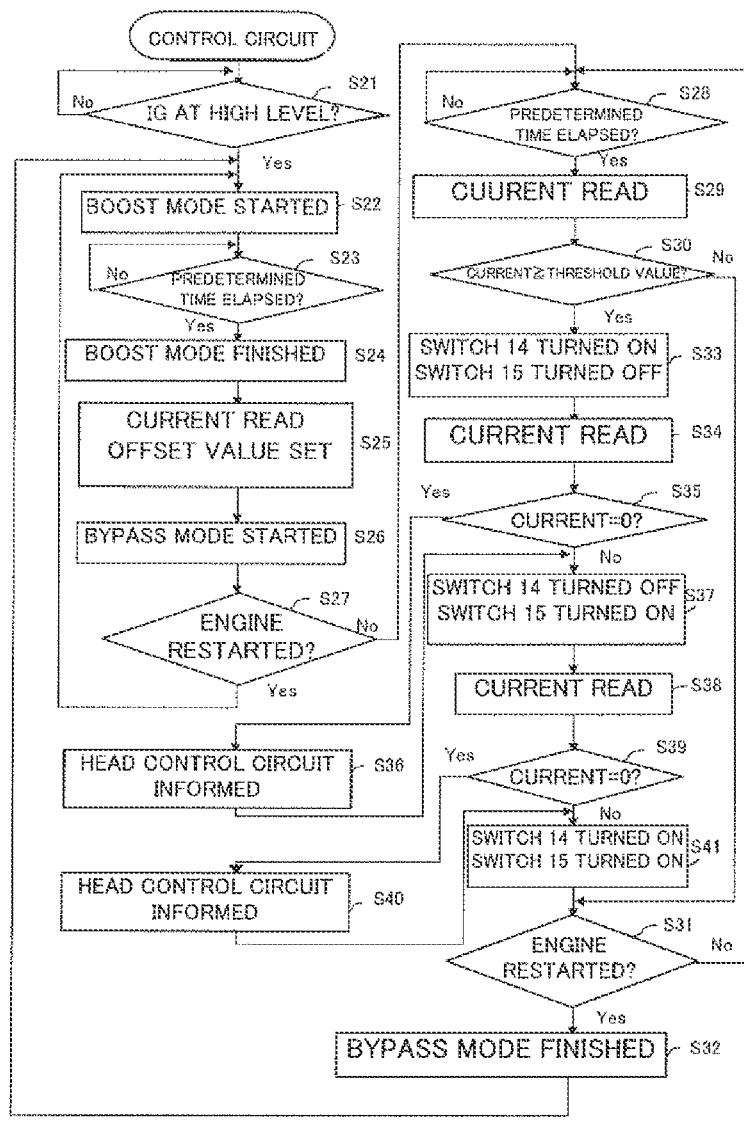
FIG. 2 is a flowchart showing the operation of the power circuit of FIG. 1.

FIG. 2 is the flowchart showing the operation of the control circuit 13 of FIG. 1. It is assumed that the first and the second switches 14, 15 are both turned on or closed in the initial state (e.g. in a parked state before starting the engine).

If the control circuit 13 is informed by the head control circuit 19 that an ignition signal (IG) is turned to a high level by user's (e.g. driver's) manipulation of the ignition switch (if Yes at S21), the boost mode operation will be executed until a predetermined length of time has elapsed (S22-S24). It is assumed that the starter motor is started to drive the engine of the vehicle when the ignition signal is turned to a high level and also that the predetermined length of time is substantially the same as the length of time of the voltage drop of the battery 2 due to the operation of the starter motor.

The control circuit 13 reads the current detected by the current detection circuit 18 and sets the read current as the offset value (S25). In other words, the control circuit 13 sets the value of the current detected by the current detection circuit 18 as the offset value during the time after the end of the boost mode operation and also before the start of the bypass mode operation (or the time when the first and the second switches 14, 15 are both kept off or opened and also the boost switching element 6 is kept off or opened).

After a start of the bypass mode operation (S26), if the control circuit 13 is informed by the head control circuit 19 of a restart of the engine after an idling stop (if Yes at S27), the process returns to S22.

On the other hand, if the control circuit 13 is not informed by the head control circuit 19 of a restart of the engine after an idling stop (if No at S27) and also the predetermined length of time (5 seconds) has elapsed (if Yes at S28) after the start of the bypass mode (S26), the control circuit 13 reads the current detected by the current detection circuit 18 (S29) and determines whether or not the value of the current is at the threshold value lth or more (S30).

If the control circuit 13 determines that the value of the current that is read at S29 is less than the threshold value 1 th (if No at S30) and subsequently the control circuit 13 is informed by the head control circuit 19 of a restart of the engine after an idling stop (if Yes at S31), the control circuit 13 finishes the bypass mode operation (S32) and returns the process to S22.

On the other hand, if the control circuit 13 determines that the value of the current read at S29 is less than the threshold value 1 th (if No at S30) and subsequently the control circuit 13 receives no information from the head control circuit 19 of a restart of the engine after an idling stop (if No at S31), the control circuit 13 reads again the current detected by the current detection circuit 18 (S29) after an elapse of the predetermined length of time (Yes at S28) and determines whether or not the value of the current is at the threshold value 1 th or more (S30).

When the control circuit 13 determines that the value of the current read at S29 is at the threshold value 1 th or more (if Yes at S30), the control circuit 13 turns on the first switch 14 and turns off the second switch 15 (S33). Subsequently, the control circuit 13 reads the current detected by the current detection circuit 18 (S34) and corrects the current by the offset value that has been set at S25 and determines whether or not the corrected current is 0 A or substantially 0 A (S35). Specifically, the control circuit 13 sets the value that is figured out by subtracting the offset value set at S25 from the value of the current detected at S34 as the corrected current value at S35.

If the control circuit 13 determines that the corrected current value is 0 A or substantially 0 A (if Yes at S35), the control circuit 13 informs the head control circuit 19 that the first switch 14 has an open fault (S36) and the process goes to S37.

On the other hand, when the control circuit 13 determines that the corrected current value is neither 0 A nor substantially 0 A (S35 is No), the control circuit 13 turns off the first switch 14 and turns on the second switch 15 (S37). Subsequently, the control circuit 13 reads the current detected by the current detection circuit 18 (S38) and corrects the current by the offset value set at S25 and determines whether or not the corrected current value is 0 A or substantially 0 A (S39). Specifically, the control circuit 13 sets the value that is figured out by subtracting the offset value set at S25 from the value of the current detected at S38 as the corrected current value at S39.

If the control circuit 13 determines that the corrected current value is 0 A or substantially 0 A (if Yes at S39), the control circuit 13 informs the head control circuit 19 that the second switch 15 has an open fault (S40) and the process goes to S41.

On the other hand, if the control circuit 13 determines that the corrected current value is neither 0 A nor substantially 0 A (S39 is No), the control circuit 13 turns on the first and second switches 14, 15 and determines whether or not the control circuit 13 per se is informed by the head control circuit 19 of a restart of the engine after an idling stop (S31).

According to the power circuit 1 of the first embodiment having the first and the second switches 14, 15, even if either one of the first and the second switches becomes unserviceable due to an open fault, the voltage of the battery 2 can be maintained and supplied to the load 3 of the vehicle through the other usable switch during the normal state other than a restart of the engine after an idling stop. Thus, the voltage of the battery 2 can be supplied stably to the load 3 of a vehicle with an idling stop control. Additionally, the provision of the two switches 14, 15 in the bypass circuit 5 permits the battery 2 to supply its voltage to the load 3 through one of the switches 14, 15 even if the other of the switches 14, 15 is faulty. As a result, no current flows from the battery 2 to the boost circuit 4 during the bypass mode operation and, therefore, heat generation of the coil 7 or the rectifier diode 8 is prevented, with the result that the coil 7 or the rectifier diode 8 can be protected against damage due to such heat.

The electronic devices that are related to fundamental performances of a vehicle such as traveling, turning and stopping and, therefore, need be supplied with a strictly controlled voltage can be used as the load 3 connected to the power circuit 1 that supplies power stably. Additionally, the power circuit 1 is configured so that no current flows from the battery 2 to the load 3 through the boost circuit 4 during the normal state operation of the engine. Therefore, the boost circuit 4 of the power circuit 1 need not use a large-capacity element for the coil 7 and the rectifier diode 8, which helps to decrease the cost of the power circuit 1.

The power circuit 1 according to the first embodiment which determines whether or not either or both of the first and the second switches 14, 15 has an open fault and informs the vehicle user of the state of the switches 14, 15 by the display 20 or the speaker 21 allows the user to recognize any trouble of the first switch 14 or the second switch 15. Therefore, the user can be prompted to replace the faulty switch or a unit including the faulty switch with a new one so as to restore the power circuit 1 timely.

Figure 3:
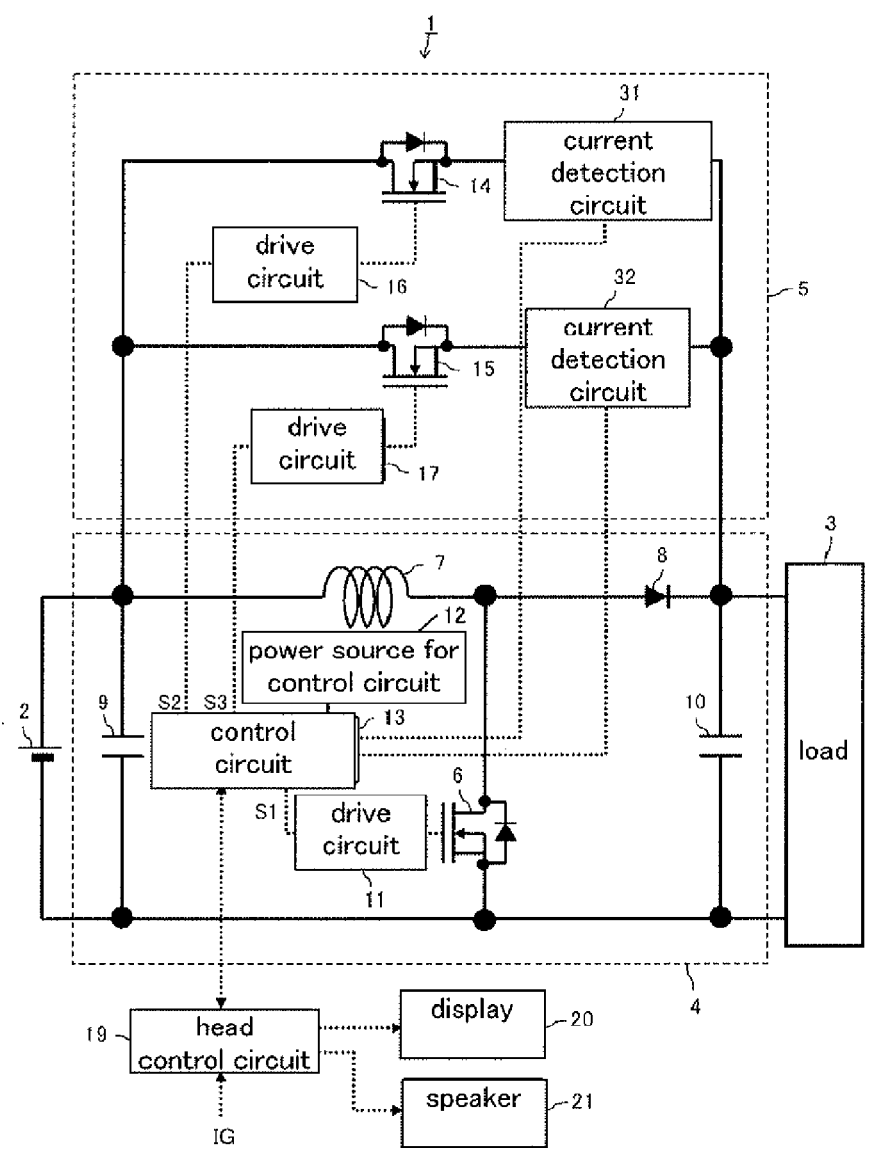
FIG. 3 is a schematic configuration diagram showing a power circuit according to a second embodiment of the present invention.

The power circuit 1 shown in FIG. 1 has only one current detection circuit 18, but may have two or more current detection circuits 18. For example, the power circuit 1 according to the second embodiment includes two current detection circuits, as shown in FIG. 3. The bypass circuit 5 of the power circuit 1 has a current detection circuit 31 for detecting the current flowing through the first switch 14 and a current detection circuit 32 for detecting the current flowing through the second switch 15. In the control circuit 13 shown in FIG. 3, during the time after the boost mode operation and also before the bypass mode operation (or when the first and the second switches 14, 15 are both turned off and the boost switching element 6 is also turned off), the values of the currents then flowing through the first and the second switches 14, 15 are set as the offset values A and B, respectively. In the control circuit 13 shown in FIG. 3, if the sum of the values of the currents detected by the current detection circuits 31, 32 is at the threshold value lth or more during the bypass mode operation and it is determined that at least one of the values of the currents read by the current detection circuits 31, 32 is 0 A or substantially 0 A, the head control circuit 19 is informed that the switch corresponding to the current detection circuit that shows 0 A or substantially 0 A has an open fault. According to the second embodiment, in determining the open fault of the first switch 14 or the second switch 15, the first and the second switches 14, 15 need not be turned off alternately and also the currents need not be read many times, so that the operation of the control circuit 13 can be simplified. Additionally, the current detection circuits are redundant in the power circuit 1 shown in FIG. 3, so that the accuracy of determining the open fault of the first switch 14 or the second switch 15 can be improved.

The power circuit 1 shown in FIG. 1 or 3 is configured so that the open fault of the first switch 14 or the second switch 15 is determined based on the current detected by the current detection circuits 18, 31, 32. The power circuit 1 according to the third embodiment shown in FIG. 4 differs from the power circuits 1 of the first and the second embodiments in that a potential difference detection circuit 41 is provided which detects the potential difference between the input and the output voltages of the boost circuit 4 and transmits a signal that is indicative of the detected potential difference to the control circuit 13 which determines whether or not an open fault is present in any of the first switch 14 and the second switch 15 based on the detection signal from the potential difference detection circuit 41. If either one of the first and the second switches 14, 15 has an open default when one of the switches 14, 15 is turned on and the other of the switches 14, 15 is turned off, the current flows from the battery 2 to the load 3 through the boost circuit 4 without flowing through the bypass circuit 5. The voltage drop of the battery 2 due to the coil 7 and the rectifier diode 8 in the boost circuit 4 is greater than that due to the first and the second switches 14, 15 in the bypass circuit 5. Therefore, the potential difference detected by the potential difference detection circuit 41 when the current flows from the battery 2 to the load 3 through the boost circuit 4 is greater than in the case when the current flows from the battery 2 to the load 3 through the bypass circuit 5. During the bypass mode operation, if the potential difference outputted by the potential difference detection circuit 41 is at the threshold value Vth or greater when one of the first and the second switches 14, 15 is turned on and the other of the switches 14, 15 is turned off, the control circuit 13 of FIG. 4 determines that one of the first and the second switches 14, 15 has an open fault and informs the head control circuit 19 of the result. The threshold value Vth may be or substantially the same as the potential difference outputted by the potential difference detection circuit 41 when a current flows from the battery 2 to the load 3 through the bypass circuit 5 at the bypass mode.

Figure 4:
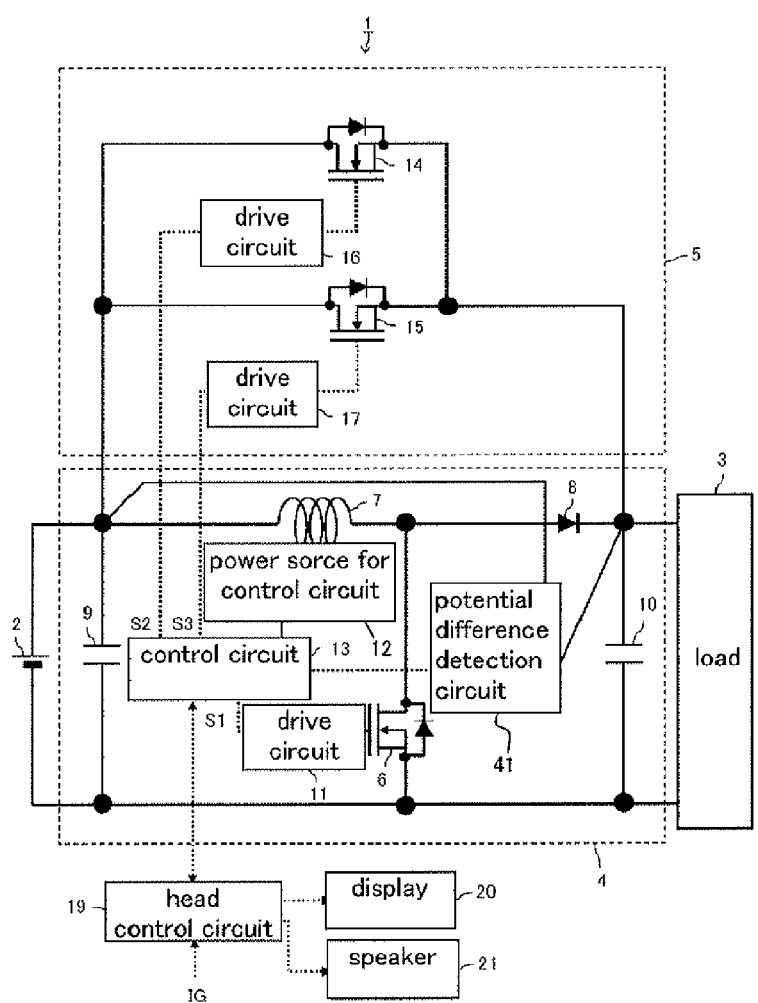
FIG. 4 is a schematic configuration diagram showing a power circuit according to a third embodiment of the present invention.
Figure 5:
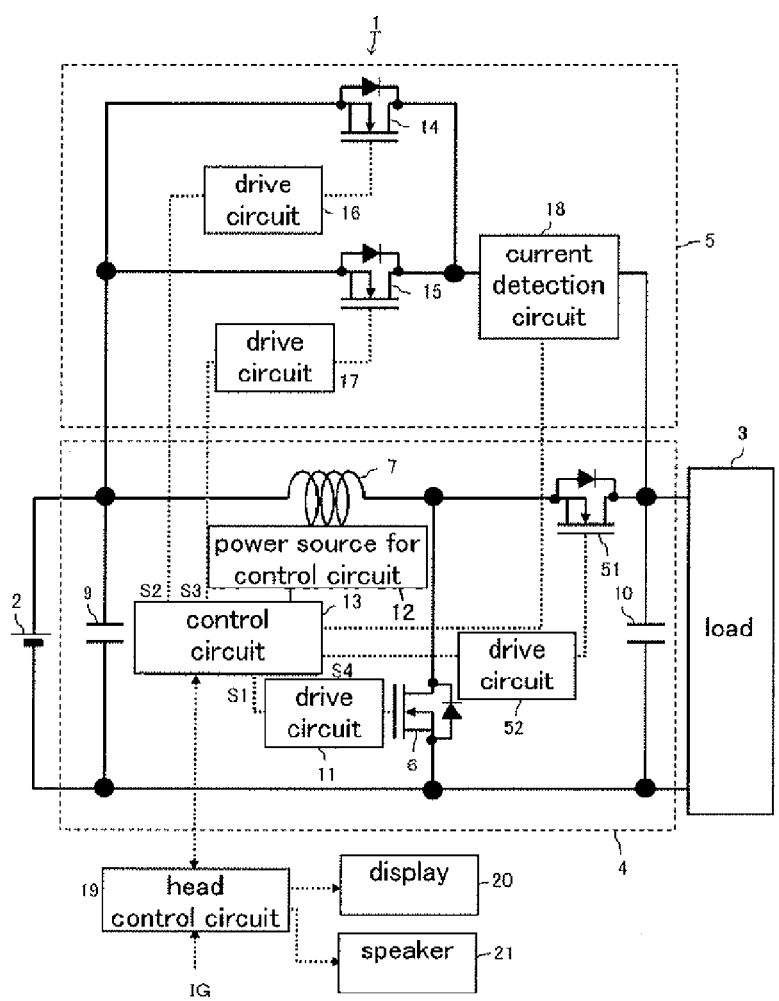
FIG. 5 is a schematic configuration diagram showing a power circuit according to a fourth embodiment of the present invention.

In the power circuit 1 shown in FIG. 1, 3 or 4, the rectifier diode 8 serves as the rectifier element in the respective boost circuits 4. The power circuit 1 according to the fourth embodiment shown in FIG. 5 differs from the foregoing embodiments of FIGS. 1, 3 and 4 in that a rectifier switching element 51 (e.g. IGBT having MOSFET and diode connected in parallel) is used to serve as the rectifier element in the boost circuit 4. A drive circuit 52 is provided in the boost circuit 4 to drive the rectifier switching element 51 based on the control signal S4 transmitted by the control circuit 13. The control circuit 13 shown in FIG. 5 turns on and off the boost switching element 6 and the rectifier switching element 51 alternately during the boost mode operation. The power circuit 1 of this embodiment can reduce the energy loss due to the rectifier element as compared with a case wherein the rectifier diode 8 serves as the rectifier element in the boost circuit 4.

Figure 6:
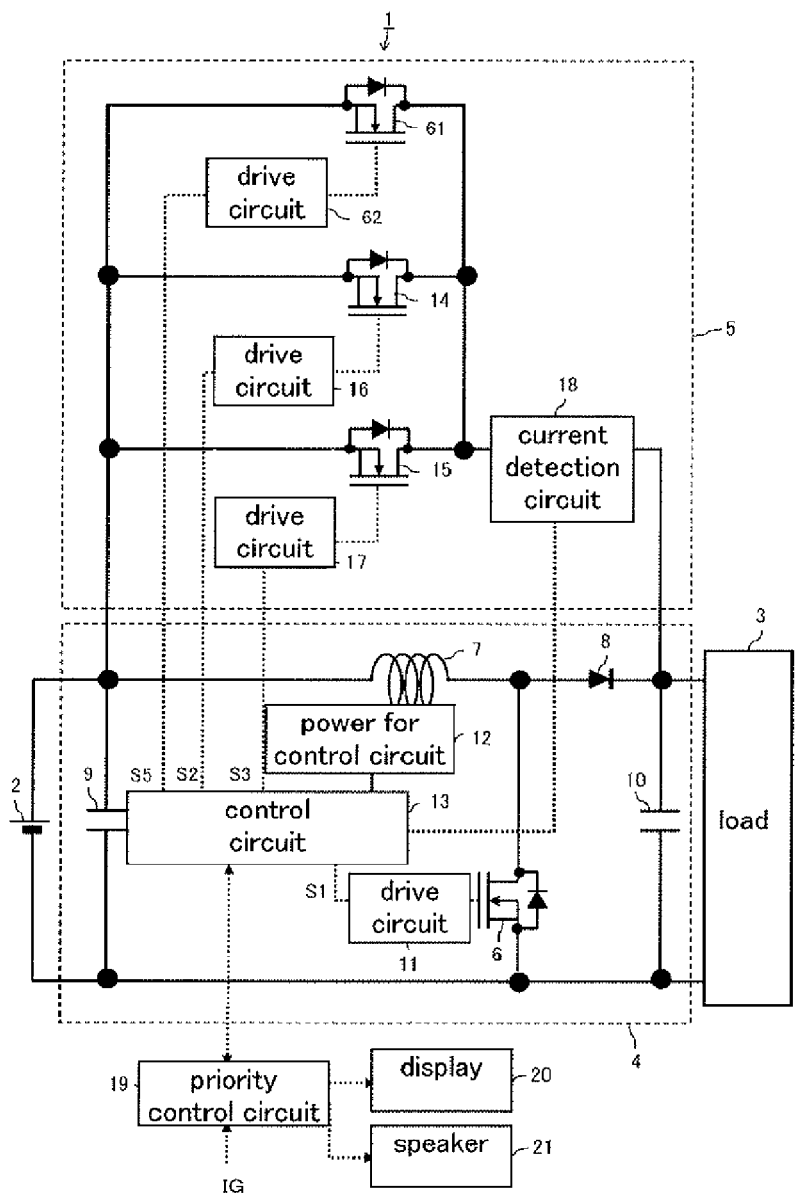
FIG. 6 is a schematic configuration diagram showing a power circuit according to a fifth embodiment of the present invention.

The power circuit 1 shown in FIG. 1, 3, 4 or 5 is so configured that the first and the second switches 14, 15 in the bypass circuit 5 are connected to the boost circuit 4 in parallel. However, the bypass circuit 5 may have more than two switches connected to the boost circuit 4 in parallel. For example, the power circuit 1 according to the fifth embodiment shown in FIG. 6 has three switches 14, 15 and 61 which are connected in parallel to the boost circuit 4. As shown FIG. 6, a drive circuit 62 is provided in the bypass circuit 5 to drive the switch 61 based on the control signal S5 transmitted by the control circuit 13. During the bypass mode operation, if the current detected by the current detection circuit 18 is 0 A or substantially 0 A when the control circuit 13 turns off the first and the second switches 14, 15 and turns on the switch 61, it is determined that the switch 61 has an open fault and the head control circuit 19 (or output means) is informed by the control circuit 13 that the switch 61 has an open fault. When the head control circuit 19 is so informed, the head control circuit 19 gives a message informing that the switch 61 has an open fault on the display 20 (or output means) or by the speaker 21 (or output means). Thus increasing the number of switches in the bypass circuit 5, the probability of a state wherein all the switches in the bypass circuit 5 are disabled can be reduced, so that the stability of supplying the voltage of the battery 2 to the load 3 can be improved.

Figure 7:
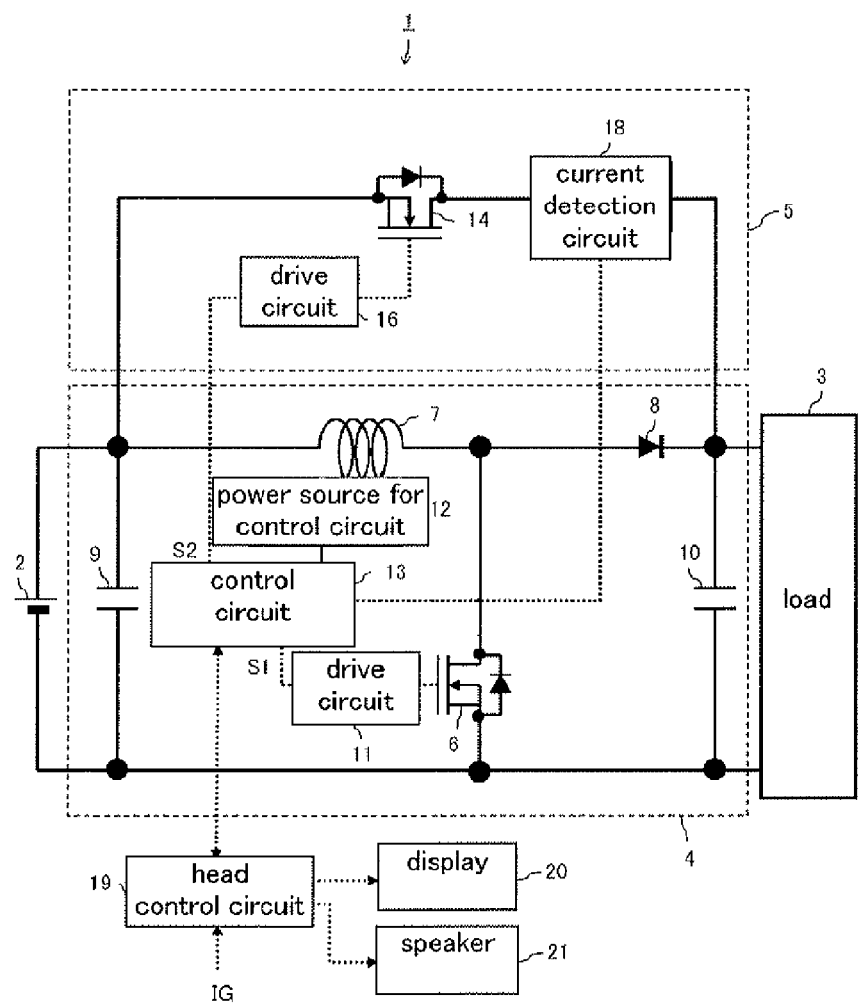
FIG. 7 is a schematic configuration diagram showing a power circuit according to a sixth embodiment of the present invention.
Figure 8:
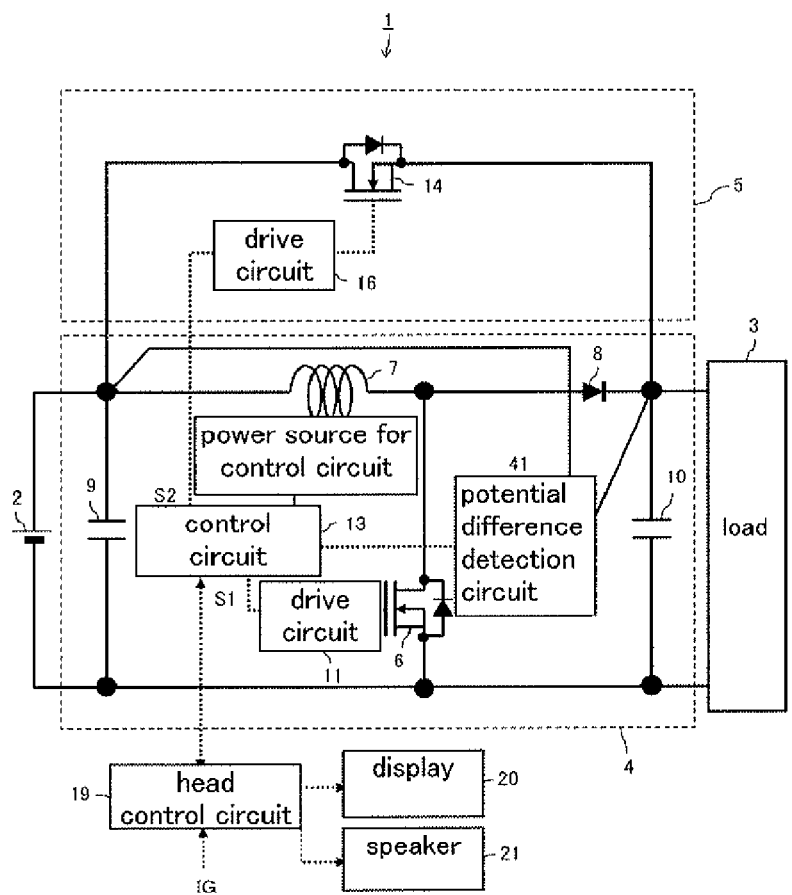
FIG. 8 is a schematic configuration diagram showing a power circuit according to a seventh embodiment of the present invention.

The power circuit 1 shown in FIG. 1, 3, 4 or 5 is so configured that each of the first and the second switches 14, 15 is connected to the boost circuit 4 in parallel. However, the power circuit 1 may be configured so that only one switch in the bypass circuit 5 is connected to the boost circuit 4 in parallel. Such examples are shown in FIGS. 7 and 8 illustrating the power circuit 1 according to the sixth and the seventh embodiments, wherein only one switch designated by 14 is connected to the boost circuit 4 in parallel, respectively.

What is claimed:

1. A power circuit comprising:
   a battery;
   a load;
   a boost circuit provided between the battery and the load, wherein the boost circuit includes:
   a boost switching element;
   a coil provided between the battery and the boost switching element; and
   a rectifier element provided between the coil and the load,
   a first switch connected to the boost circuit in parallel;
   a current detection circuit detecting current flowing through the first switch; and
   a control circuit turning on the first switch during a normal state other than a restart of an engine after an idling stop, the control circuit turning off the first switch and controlling an operation of the boost switching element at a restart of the engine after an idling stop so that voltage of the battery is boosted and supplied to the load, wherein the control circuit determines based on the current detected by the current detection circuit during the normal state whether or not the first switch has an open fault, wherein after the restart of the engine and before the normal state, the control circuit reads a value of the current detected by the current detection circuit and sets the read value as an offset value, and wherein after the normal state and before the restart of the engine, the control circuit reads a value of the current detected by the current detection circuit and corrects the read value by the offset value.

2. The power circuit according to claim 1, further comprising:
   a second switch connected to the boost circuit in parallel, wherein the current detection circuit detects current flowing through the second switch, wherein during the normal state, the control circuit turns off the first switch and the second switch alternately at a regular time interval and determines based on the current detected by the current detection circuit whether or not the second switch has an open fault while the first switch is turned off and also whether or not the first switch has an open fault while the second switch is turned off.

3. The power circuit according to claim 1, further comprising:

a second switch connected to the boost circuit in parallel; and another current detection circuit detecting current flowing through the second switch, wherein the control circuit determines based on the currents detected by the respective current detection circuits during the normal state whether or not either or both of the first switch and the second switch has an open fault.

4. The power circuit according to claim 1, wherein a rectifier switching element serves as the rectifier element.

5. A power circuit comprising:

a battery;

a load;

a boost circuit provided between the battery and the load, wherein the boost circuit includes:

a boost switching element;

a coil provided between the battery and the boost switching element; and a rectifier element provided between the coil and the load, a first switch connected to the boost circuit in parallel;

a potential difference output circuit detecting potential difference between input voltage and output voltage of the boost circuit; and a control circuit turning on the first switch during a normal state other than a restart of an engine after an idling stop, the control circuit turning off the first switch and controlling an operation of the boost switching element at a restart of the engine after an idling stop so that voltage of the battery is boosted and supplied to the load, wherein the control circuit determines based on the potential difference detected by the potential difference output circuit during the normal state whether or not the first switch has an open fault, and wherein during the normal state, if the potential difference outputted by the potential difference detection circuit is a threshold value or greater when the first switch is turned on, the control circuit determines that the first switch has an open fault.

6. The power circuit according to claim 5, wherein the threshold value is substantially the same as the potential difference outputted by the potential difference detection circuit when a current flows from the battery to the load through the bypass circuit during the normal state.

7. The power circuit according to claim 5, further comprising a second switch connected to the boost circuit in parallel, wherein during the normal state, if the potential difference outputted by the potential difference detection circuit is a threshold value or greater when one of the first and the second switches is turned on and the other of the first and the second switches is turned off, the control circuit determines that one of the first and the second switches has an open fault and informs a head control circuit of the result.

8. The power circuit according to claim 5, wherein a first capacitor is provided in an input stage of the boost circuit and a second capacitor is provided in an output state of the boost circuit.

9. The power circuit according to claim 1, wherein a first capacitor is provided in an input stage of the boost circuit and a second capacitor is provided in an output state of the boost circuit.

* * * * *